(12) United States Patent
Shaabani et al.

(10) Patent No.: US 12,500,923 B2
(45) Date of Patent: Dec. 16, 2025

(54) IDENTIFYING COORDINATED MALICIOUS ACTIVITIES USING SEQUENCES OF REQUESTS

(71) Applicant: Microsoft Technology Licensing, LLC, Redmond, WA (US)

(72) Inventors: Elham Shaabani, San Carlos, CA (US); James R. Verbus, San Mateo, CA (US); Ting Chen, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 18/314,723

(22) Filed: May 9, 2023

(65) Prior Publication Data
US 2024/0380779 A1    Nov. 14, 2024

(51) Int. Cl.
*H04L 9/00* (2022.01)
*H04L 9/40* (2022.01)

(52) U.S. Cl.
CPC ...... *H04L 63/1441* (2013.01); *H04L 63/1416* (2013.01)

(58) Field of Classification Search
CPC ............. H04L 63/1441; H04L 63/1416; H04L 63/1425
See application file for complete search history.

(56) References Cited

U.S. PATENT DOCUMENTS

| 902,654 A | 11/1908 | Hannas |
| 2020/0007634 A1* | 1/2020 | Xie ................... G06Q 30/0282 |

OTHER PUBLICATIONS

Z. Ellaky, F. Benabbou, S. Ouahabi and N. Sael, "Word Embedding for Social Bot Detection Systems," 2021 Fifth International Conference On Intelligent Computing in Data Sciences (ICDS), Fez, Morocco, 2021, pp. 1-8, doi: 10.1109/ICDS53782.2021.9626752. (Year: 2021).*

Ellaky, Zineb, et al. "Word embedding for social bot detection systems." 2021 Fifth International Conference On Intelligent Computing in Data Sciences (ICDS). IEEE, 2021. (Year: 2021).*

Ellaky, et al., "Word Embedding for Social Bot Detection Systems", 2021 Fifth International Conference On Intelligent Computing in Data Sciences (ICDS), IEEE, Oct. 20, 2021, pp. 1-8.

(Continued)

*Primary Examiner* — Syed M Ahsan
(74) *Attorney, Agent, or Firm* — Nicholson De Vos Webster & Elliott LLP

(57) ABSTRACT

Embodiments of the disclosed technologies create a term frequency-inverse document frequency (tf-idf) model of interactions of user accounts with an online system, and, using the tf-idf model, identify a subset of the user accounts as being involved in a malicious use of the online system. The tf-idf model is created by, for a user account, storing a sequence of requests received by the online system from the user account over a time interval as a document, where a request includes a digital communication from the user account to the online system, and generating a feature embedding for the sequence of requests, where the feature embedding is based on a relationship between a frequency of occurrence of a request in the document and a number of documents that include the request.

16 Claims, 15 Drawing Sheets

(56) References Cited

OTHER PUBLICATIONS

Guarino, et al., "Characterizing Networks of Propaganda on Twitter: a Case Study", arxiv.org, Cornell University Library, 201 Olin Library Cornell University Ithaca, NY 14853, Sep. 23, 2020, pp. 1-19.

International Search Report and Written Opinion received for PCT Application No. PCT/US2024/025897, Jul. 5, 2024, 16 pages.

Rao, et al., "A Review on Social Spam Detection: Challenges, Open Issues and Future Directions", Expert Systems With Applications, Elsevier, Amsterdam, NL, vol. 186, Aug. 14, 2021, pp. 1-31.

Luo, et al., "BotGraph: Web Bot Detection Based on Sitemap", In Repository of arXiv:1903.08074v1, Mar. 19, 2019, 7 Pages.

Noorshams, et al., "TIES: Temporal Interaction Embeddings For Enhancing Social Media Integrity At Facebook", In Repository of arXiv:2002.07917v1, Feb. 18, 2020, 9 Pages.

Zhao, et al., "BotGraph: Large Scale Spamming Botnet Detection", In Proceedings of 6th USENIX Symposium on Networked Systems Design and Implementation, Apr. 22, 2009, pp. 321-334.

\* cited by examiner

500

502 ← ["realtime/connect", "li/track", "realtime/realtimeFrontendSubscriptions",
"voyager/api/voyagerCommunicationsTabBadges", "voyager/api/messaging/conversations", "sw.js", "li/track",
"li/track", "voyager/api/relationships/invitationViews", "voyager/api/relationships/invitationViews",
"voyager/api/relationships/myNetworkNotifications", "voyager/api/relationships/invitationsSummaryV2",
"voyager/api/relationships/cohorts", "voyager/api/relationships/discovery",
"voyager/api/growth/promotionTemplate", "voyager/api/onboarding/launchpadCard", "li/track",
"voyager/sw/vitals", "li/track", "li/track", "li/track", "li/track",
"voyager/api/relationships/myNetworkNotifications", "voyager/api/relationships/discovery", "li/track",
"voyager/api/feed/richRecommendedEntities", "voyager/api/growth/colleagueRelationshipsViews", ....]

504 ← [""lix/treatments", "lix/treatments", "mwlite/in", "lix/treatments", "lix/treatments", "mwlite/in", "li/track",
"lix/treatments", "voyager/api/configuration", "lix/treatments", "voyager/api/me",
"voyager/api/voyagerDashMySettings", "li/track", "mwlite/in", "mwlite/in", "li/track", "mwlite/in", "mwlite/in", "in",
"lix/treatments", "lix/treatments", "mwlite/in", "li/track", "company", "mwlite/in", "lix/treatments",
"lix/treatments", "mwlite/in", "mwlite/in", "in", "in", "lix/treatments", "mwlite/in", "in", "in",
"lix/treatments", "mwlite/in", "mwlite/in", "in", "mwlite/in", "in", "mwlite/in",
"lix/treatments", "lix/treatments", "mwlite/in", "in", "mwlite/in", "in", "mwlite/in",
"mwlite/in", "in", "mwlite/in", "in", "mwlite/in", "in", "mwlite/in", "in", "mwlite/in", "mwlit,e /in", "mwlite/in",
"mwlite/in", "in", "in", "in", "mwlite/in", "mwlite/in", "in", "mwlite/in", "in", "mwlite/in", "in", "nm", "w lite/in", "in",
"mwlite/in", "in", "mwlite/in", "mwlite/in", "in", "mwlite/in", "in", "mwlite/in", "in", "in", "mwlite/in",
"mwlite/in", "in", "in", "mwlite/in", "in", ,...]

FIG. 5

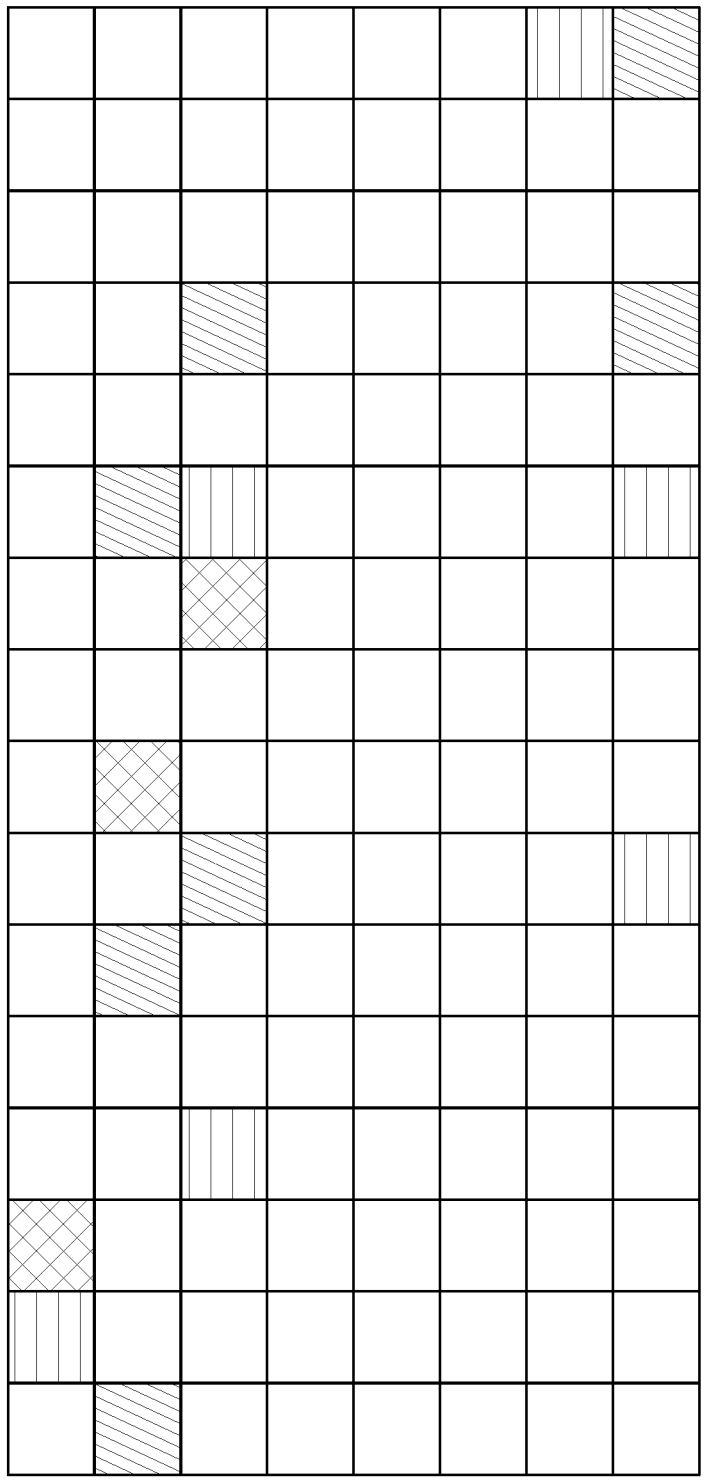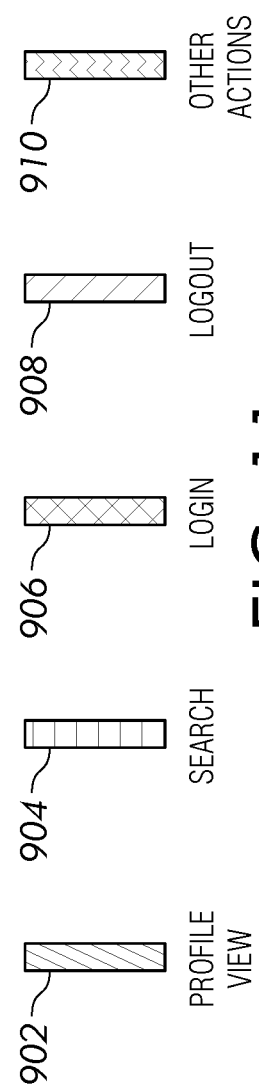
FIG. 11

IDENTIFYING COORDINATED MALICIOUS ACTIVITIES USING SEQUENCES OF REQUESTS

TECHNICAL FIELD

A technical field to which the present disclosure relates is malicious activity detection for online platforms.

BACKGROUND

Online platforms, such as social graph applications or social media platforms, receive millions of requests from user devices and other sources. As online platforms operate with an increasingly global user base, the online platforms are expected to be able to manage increasing amounts of requests.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 is an example of request sequences 500 in accordance with some embodiments of the present disclosure.

FIG. 11 is a diagram illustrating a visualization of a resulting encoded activity sequence of a second user, in accordance with some embodiments of the present disclosure.

DETAILED DESCRIPTION

Figure 1:
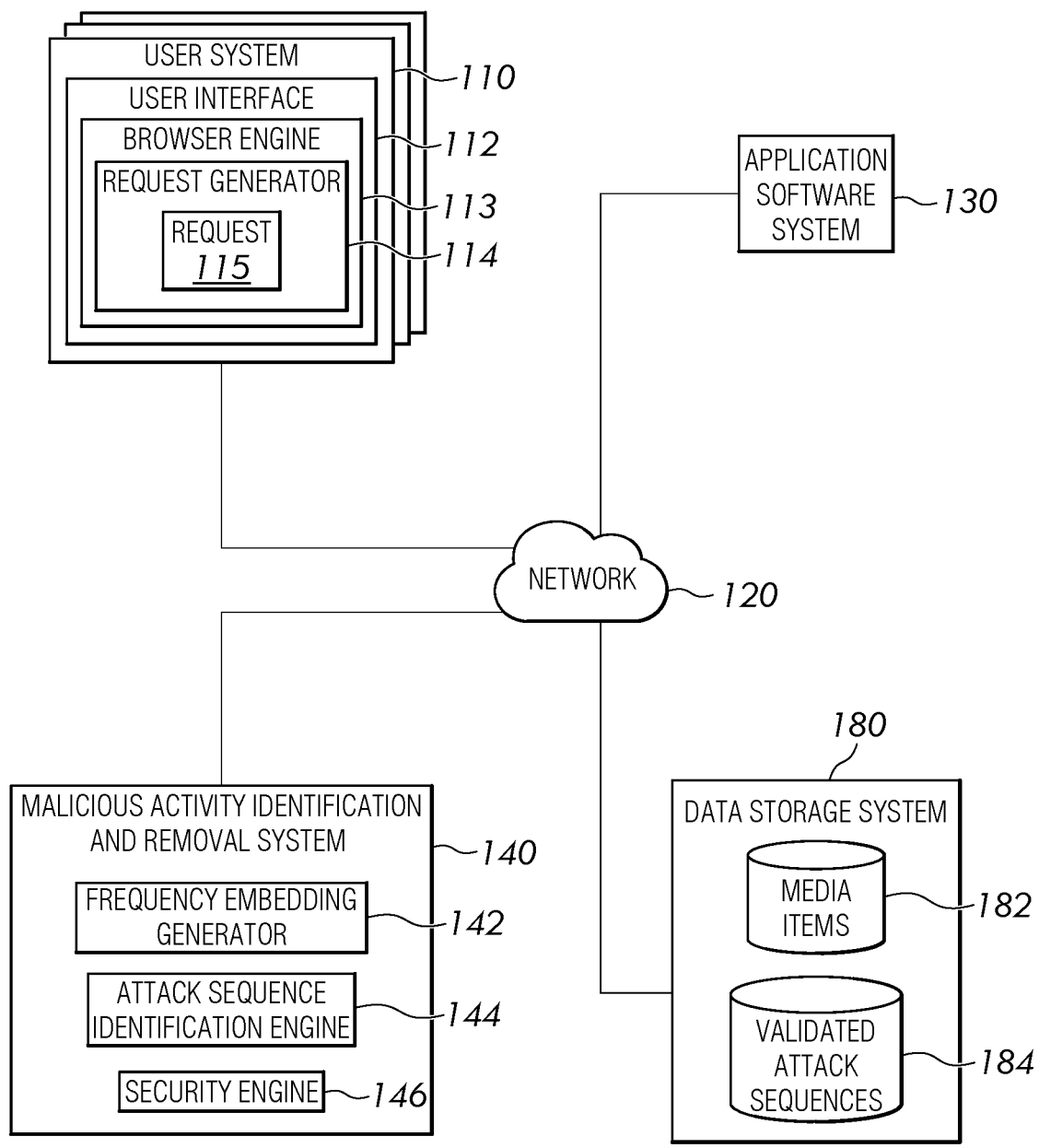
FIG. 1 illustrates an example computing system 100 that includes an attack sequence identification engine 144 in accordance with some embodiments of the present disclosure.

Computer networks, such as the Internet, provide user systems access to application software systems. The application software systems communicate with the user systems over networks by receiving requests from the user systems and providing responses to those requests. Examples of requests that may be received from user systems include application programming interface (API) calls and HTTP (HyperText Transfer Protocol) requests. Examples of system responses to requests include serving web pages, content, or other data to the requesting user systems through the network. In some implementations, user systems receive different responses for different types of requests. Examples of different types of requests include requests to view a profile, log in to or register with an application, send a message, or log out. These requests and responses are executed via the user systems (e.g., end user devices) and application software systems. For example, requests and responses can be implemented in a web browser or mobile app. Occasionally, groups of users attempt to manipulate the request-and-response communication mechanisms of application software systems, for example. However, some users or user devices are used in attempts to perform coordinated malicious activity while avoiding detection.

Identifying coordinated malicious activity and applying a security action to mitigate the malicious activity in a scalable way becomes increasingly challenging as malicious users scale exploitation tactics in response to traditional security measures. Malicious activities can be automated and scaled using tools and browser extensions to, for example, send mass invitations, send spam messages, scrape various pages, and/or gather large quantities of sensitive user information such as user profile data. As an additional challenge, coordinated action among a group of malicious users provides an attacker with scalability that can distribute the attack tasks (e.g., profile scraping, sending spam, etc.) across many different user accounts.

Detecting these coordinated groups of malicious accounts is difficult using conventional techniques, which require extensive human effort to find patterns of coordinated malicious activity. Malicious users are quick to adapt and evolve in response to human pattern finding. For example, malicious users can operate browser extensions in the web browser of the user system. The browser extensions can modify the user interface to add features and functionalities using web APIs (application programming interfaces), such as HTML (HyperText Transfer Protocol and JavaScript. Detection of some extensions can be based on element ID (identifier), class name, or extension ID, but requires manual investigation. This is because malicious actors can easily change the IDs and names, which results in the detection process having to start over each time the IDs or names are changed.

This disclosure provides technical solutions to the above-described challenges and other shortcomings of prior malicious activity identification techniques. In contrast to prior approaches, aspects of the disclosed technologies can automatically identify malicious account activity by coordinated groups of users applying similar attack processes in real-time. As a result, security actions are scalable to detect and thwart the malicious activities of distributed, coordinated groups of users.

Aspects of the disclosed technologies model sequences of requests using a term frequency-inverse document frequency approach. Examples of request sequences are shown in FIGS. 9, 10, and 11, described below.

Figure 9:
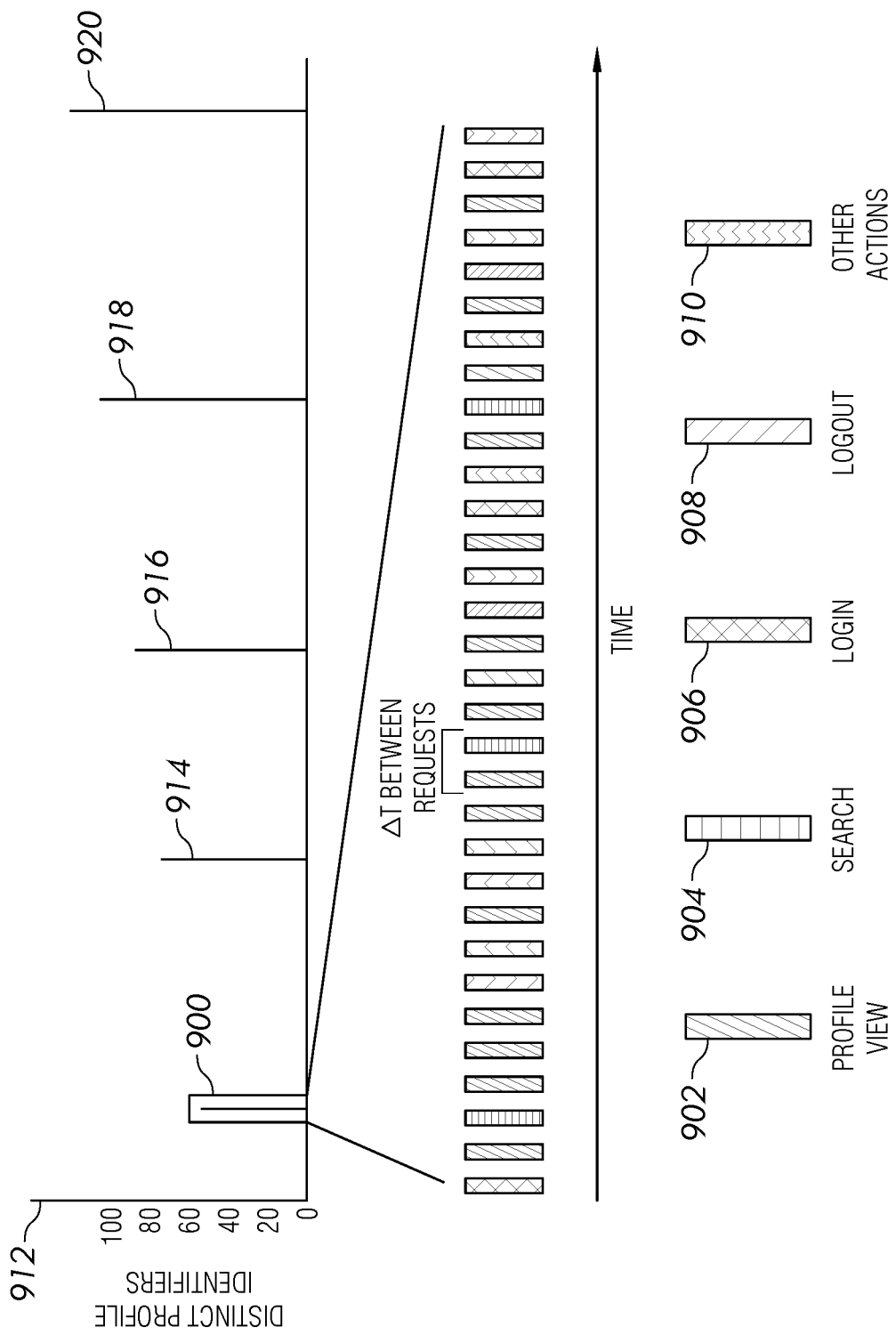
FIG. 9 is a diagram illustrating a visualization of profile scraping activity by an end-user, in accordance with some embodiments of the present disclosure.

FIG. 9 is a diagram illustrating a visualization of a particular type of request sequence, which embodiments of the disclosed technologies may identify as profile scraping activity of an end-user of an online system. As illustrated by FIG. 9, a sequence of requests 900 is shown as a series of discrete requests, each classified under a different "type" of request. For example, some of the requests are profile view requests 902, some of the requests are search requests 904, some of the requests are login requests 906, some of the requests are logout requests 908, and the remainder are classified as "other user actions" 910. Graph 912 depicts how each sequence, such as sequence of requests 900, sequence 914, sequence 916, sequence 918, and sequence 920 may be performed at different times or in different sessions. Each sequence represents a series of requests. The y-axis of the graph 912 represents a number of distinct profile views—each unique profile viewed is assigned a new identifier. The x-axis is time. In the example illustrated by FIG. 9, the graph 912 depicts that an end-user sent five bursts of profile view requests with approximately 20 profiles each, while occasionally revisiting the same profiles the end-user had viewed previously.

In some embodiments, an automated process may be used to translate the specific path in each request a user makes into a standardized or normalized token format. For example, each specific request path is translated into the standardized or normalized token that includes an indicator of the type of the request (e.g., profile view, search, login, etc.). Each token is an alphanumeric sequence that uniquely corresponds to the type of the request. For example, "profile view" may represent a profile view, or alternatively "1X3F" may represent a profile view. Thus, if the path in the request corresponds to a profile view, then this path is translated to "profile view." This is performed in an automated manner that does not require human curation. The result is an encoded activity sequence, where each request path has been replaced by a standardized token representing the activity type. The requests in the sequence of requests are encoded in the same order as the requests are received. In an example, if a particular request came first in the sequence, then when that request is standardized, the resultant token will also come first in the encoded version of the sequence. The same is true for all the other requests in the sequence. Thus, the encoded sequence of requests includes the encoded requests and the order of those encoded requests.

Figure 10:
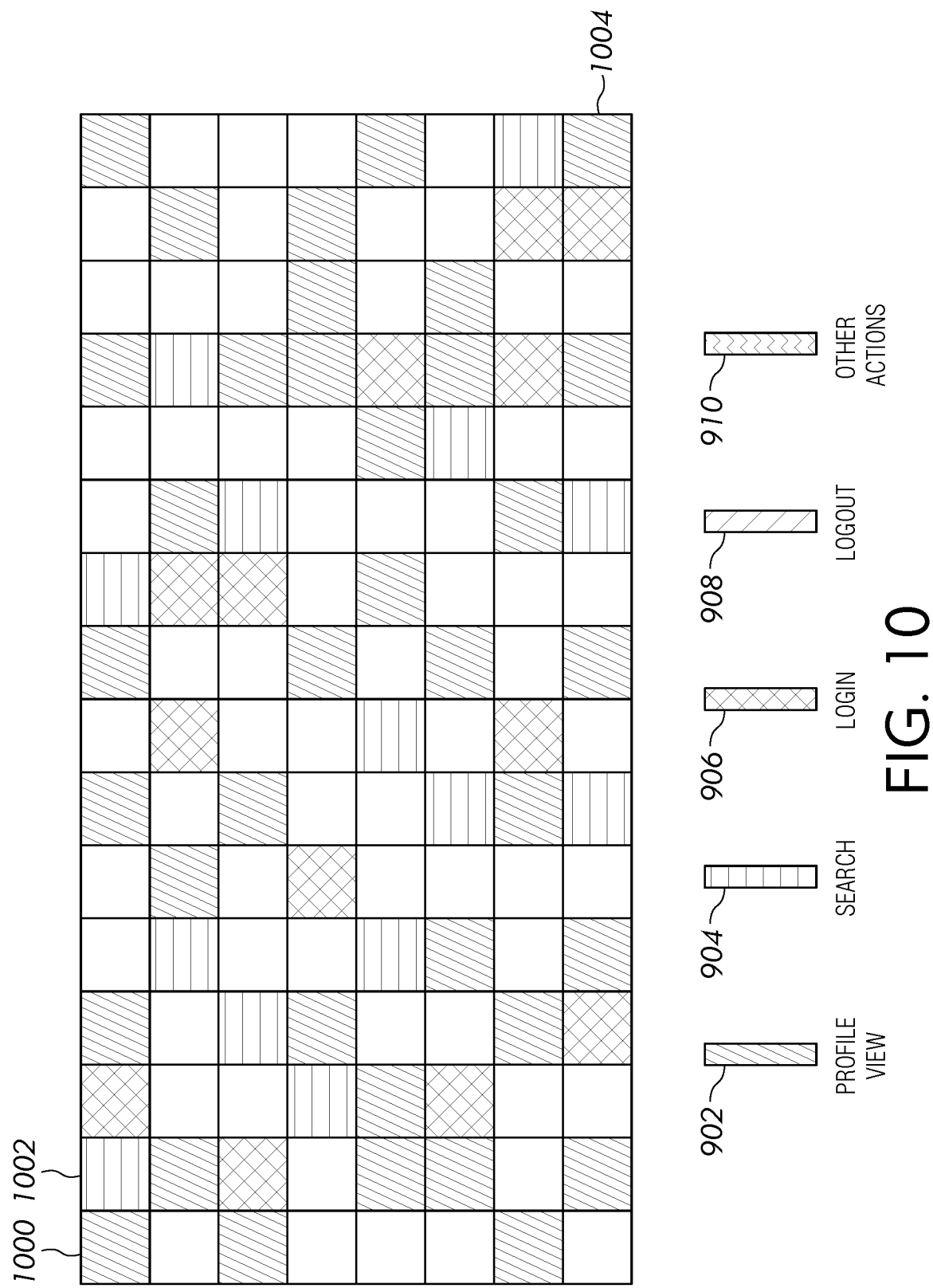
FIG. 10 is a diagram illustrating a visualization of a resulting encoded activity sequence of a first user, in accordance with some embodiments of the present disclosure.

FIG. 10 is a diagram illustrating a visualization of another type of request sequence, e.g., an encoded sequence of requests, in accordance with some embodiments of the present disclosure. As depicted in FIG. 10, each request is represented as a box with a pattern that identifies the type of request, such as box 1000 or box 1002. These boxes are patterned in a way that common paths use the same pattern, and the uncommon paths use a different pattern (with different patterns for different levels of commonality in the paths). The visualization may be read left to right, top to bottom, with the first request being at box 1000, and the last at box 1004. In the example depicted by FIG. 10, embodiments of the disclosed technologies may determine that the sequence of requests is not a malicious sequence of requests because the requests follow a normal user distribution.

FIG. 11 is a diagram illustrating a visualization of another type of request sequence, e.g., a different encoded sequence of requests, in accordance with some embodiments of the present disclosure. As depicted in FIG. 11, embodiments of the disclosed technologies may determine that the sequence of requests represents a malicious sequence because the sequence of requests lack the subtle patterns of requests created by normal, healthy, organic user behavior in an online network.

The patterns of request sequences shown in FIG. 9, FIG. 10, and FIG. 11 are exemplary visualizations of online activities that can be detected by aspects of the disclosed technologies.

While some aspects of the disclosed technologies are described in the context of application software systems such as social network services and online media hosting services, those and other aspects are not limited to social network services or online media hosting services. Further, any network-based application software system is vulnerable to similar types of attacks. For example, news, entertainment, and e-commerce apps installed on mobile devices, enterprise systems, messaging systems, and social graph-based applications can all function as application software systems that receive requests from end user devices.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example of a computing system 100 that includes a malicious activity identification and removal system, including an attack sequence identification engine in accordance with some embodiments of the present disclosure. In the embodiment of FIG. 1, computing system 100 includes one or more user systems 110, a network 120, an application software system 130, a malicious activity identification and removal system 140, and a data storage system 180.

As described in more detail below, components of the attack sequence identification engine 144 are implemented in a malicious activity identification and removal system 140 of computing system 100. In the implementation of FIG. 1, a request generator 114 that creates a request 115 is a component of browser engine 113 while a frequency embedding generator 142 and security engine 146 are components of malicious activity identification and removal system 140. Also, in the implementation of FIG. 1, browser engine 113 is a component of a user interface 112 of user system 110. The computing system 100 also includes a data storage system 180 including a database of media items 182. The database of media items 182 can be accessed remotely, such as in response to receiving the request 115.

A user system 110 includes at least one computing device, such as a personal computing device, a server, a mobile computing device, or a smart appliance, and at least one software application or at least one computing device is capable of executing the attack sequence identification engine 144. Many different user systems 110 can be connected to network 120 at the same time or at different times. Different user systems 110 can contain similar components as described in connection with the illustrated user system 110. For example, many different end users of computing system 100 can be interacting with many different instances of browser engine 113 on their respective user systems 110, at the same time or at different times.

User system 110 includes a user interface 112. User interface 112 is installed on or accessible to user system 110 by network 120. For example, embodiments of user interface 112 include a graphical display screen that includes at least one slot. A slot as used herein refers to a space on a graphical display such as a web page or mobile device screen, into which digital content including multimedia files may be loaded for display to the user. The locations and dimensions of a particular slot on a screen are specified using, for example, a markup language such as HTML (Hypertext Markup Language). On a typical display screen, a slot is defined by two-dimensional coordinates. In other implementations such as virtual reality or augmented reality implementations, a slot may be defined using a three-dimensional coordinate system.

User interface 112 can be used to input data, upload, download, receive, send, or share content including multimedia files, initiate user interface events, and view or otherwise perceive output such as data produced by application software system 130, and/or malicious activity identification and removal system 140. For example, user interface 112 can include a graphical user interface (GUI), a conversational voice/speech interface, a virtual reality, augmented reality, or mixed reality interface, and/or a haptic interface. User interface 112 includes a mechanism for logging in to application software system 130 and/or malicious activity identification and removal system 140, clicking or tapping on GUI elements, and interacting with digital content items such as multimedia files. Examples of user interface 112 include web browsers, command line interfaces, and mobile app front ends. User interface 112 as used herein can include application programming interfaces (APIs).

Request generator 114 generates a request 115 in response to interactions of an end user with the browser engine 113. The request generator 114 creates a request 115 that includes an HTTP request, an API call, or another type of request for inter-device communication between any user system 110 and the malicious activity identification and removal system 140 using the network 120. In some embodiments, the request generator 114 generates a sequence of requests for the user system 110 in response to a series of end user inputs. As described above with reference to FIGS. 9-11, each request includes a request for an application software system (e.g., application software system 130) to provide specific content to the user system 110. The request identifies a type of content that is requested, such as a profile view request, a login request, a logout request, or other user actions. A request 115 includes an electronic communication between a user system 110 and the application software system 130, and a sequence of requests includes a series of one more electronic communications between the user system 110 and the application software system 130. For example, a sequence of requests can include all electronic communications between a particular user system 110 and a particular application software system 130 during a defined time interval, e.g., within the most recent previous twenty-four hours, etc.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that provides or enables the creation and/or distribution of at least one form of digital content to user systems such as user system 110 through user interface 112. In some implementations, malicious activity identification and removal system 140, frequency embedding generator 142, attack sequence identification engine 144, and/or security engine 146 are components of application software system 130 rather than separate components of computing system 100. Examples of application software system 130 include but are not limited to online services such as online learning or education platforms, professional social network software and/or other social graph-based applications, as well as other online systems that are or are not based on social graph software, such as general-purpose search engines, specific-purpose search engines, messaging systems, content distribution platforms, e-commerce software, enterprise software, or any combination of any of the foregoing or other types of software.

In some implementations, application software system 130 is a software as a service (SaaS) platform that hosts and media files, and which interfaces with malicious activity identification and removal system 140 to detect and mitigate malicious activities. While using application software system 130, an end-user of the user system 110 can, for example, search for and browse media items 182, such as user profiles, company profiles, job postings, articles, and other forms of digital content, which may be distributed by the application software system 130. The application software system 130 may retrieve the media items 182 from the data storage system 180. For example, to select a media item 182 for viewing, downloading, etc., a user system 110 communicates a request 115 (or series of requests 115) to the application software system 130 through the browser engine 113. The request 115 is generated by the request generator 114 in response to inputs received from the user via the user interface 112.

The malicious activity identification and removal system 140 interfaces with the application software system 130 or directly with the user system 110 to obtain the request 115. For example, malicious activity identification and removal system 140 sends a query to application software system 130 from time to time to obtain requests 115 that application software system 130 has stored in, e.g., log files associated with user sessions or databases. In response to receiving requests 115 from the application software system 130 or directly from any of the user systems 110, the malicious activity identification and removal system 140 uses the requests 115 to create models of request sequences and uses the created models to detect request sequences of interest, such as request sequences that match patterns of malicious activities.

A client portion of application software system 130 can operate in user system 110, for example as a plugin or widget in a graphical user interface of a web application, mobile software application, or as a web browser executing user interface 112. For example, browser engine 113 can be implemented in a client portion of application software 130, and request generator 114 can be implemented as a plugin to generate communications between user system 110 and the application software system 130 in response to inputs or selections of the end user.

In an embodiment, a mobile app or a web browser of a user system 110 can transmit a network communication such as the request 115 over network 120 in response to user input that is received through a user interface provided by the web application, mobile app, or web browser, such as user interface 112. A server running application software system 130 can receive the input from the web application, mobile app, or browser engine 113, perform at least one operation using the input, and return output to the user interface 112 using a network communication such as an HTTP response, which the web application, mobile app, or browser engine 113 receives and processes at the user system 110.

Malicious activity identification and removal system 140 includes a frequency embedding generator 142. Frequency embedding generator 142 computes a frequency embedding from a sequence of requests 115. For example, during operations of the malicious activity identification and removal system 140, each of the user systems 110 communicates various sequences of requests 115 to the application software system 130 over time, the malicious activity identification and removal system 140 obtains the sequences of requests 115 and applies frequency embedding generator 142 to the sequences of requests 115 to generate frequency embeddings. The frequency embedding generator 142 computes a term frequency-inverse document frequency (TF-IDF) score for each sequence of requests 115. To compute the TF-IDF score for each request sequence 115, the frequency embedding generator 142 applies a TF-IDF algorithm to the sequence of requests 115. Using the parlance of TF-IDF, each request in a request sequence is considered a "term" for which a term frequency is computed, and each request sequence 115 is considered a "document" for which an inverse document frequency is computed. For example, given a log file that contains a time-ordered listing of all of the requests communicated by a certain user system to a certain application software system over a certain twenty-four hour period, a "request" or "term" could be "view profile" and a "request sequence" or "document" could be the log file (e.g., the entire contents of the log file that contains the request, or all of the requests contained in the log file).

The frequency embedding generator 142 identifies a term frequency of each type of request (e.g., a request is a term and the frequency of requests is the term frequency) and then computes a ratio of the number of request sequences in which each request type occurs. In a simplified example, for sequences of requests [a, b, c]; [a, b, d]; [a, c, d, e, f], the corresponding term frequencies for the sequences are [0.33, 0.33, 0.33]; [0.33, 0.33, 0.33]; [0.20, 0.20, 0.20, 0.20, 0.20]. To compute the inverse document frequency, for example, for request "b," the frequency generator computes a logarithmic relationship, such as base 10, for the request "b." The resulting inverse document frequency for request "b" is Log(3/2) or "0.1761." Additional details of the frequency embedding generator 142 are described below.

Malicious activity identification and removal system 140 includes an attack sequence identification engine 144. The attack sequence identification engine 144 receives the frequency embeddings computed by the frequency embedding generator 142 for each sequence of requests, in some implementations for all of the user systems 110. The attack sequence identification engine 144 searches a data store of validated attack sequences 184 for one or more request sequences that match one or more of the received frequency embeddings. The validated attack sequences 184 include sequences of requests that have been previously received and identified as attack sequences (e.g., "known" attack sequences). An attack sequence includes a sequence of requests that match a previously-identified pattern of malicious network activity such as data scraping or other types of attempts to use network requests to inappropriately extract data from the application software system 130. The attack sequence identification engine 144 computes a similarity score using, for example, a cosine similarity or other suitable similarity algorithm, between each received frequency embedding and each validated attack sequence. By performing the similarity computations, the attack sequence identification engine 144 can identify, from among the received frequency embeddings, one or more of the received frequency embeddings as a potential attack sequence. In some embodiments, the attack sequence identification engine applies normalized threshold values, described in more detail below, to the frequency embeddings and computes a probabilistic or statistical a likelihood that the frequency embedding represents an attack sequence based on the normalized threshold values.

In an example, the attack sequence identification engine 144 compares a first sequence of requests that includes the requests [lix/treatments; mwlite/in; lix/treatments; li/track; "company"; mwlite/in] and a second sequence of requests includes the requests [realtime/connect; li/track; realtime/realtimefrontendsubscriptions; api/messaging/conversations; li/track] to a number of validated attack sequences 184 in data storage system 180. The attack sequence identification engine 144 computes a similarity for each of the first sequence of requests and the second sequence of requests to the validated attack sequences 184. For similarities that are greater than a threshold similarity, the first sequence of requests and/or the second sequence of requests are labeled as a potential attack sequence.

In some embodiments, if the attack sequence identification engine 144 labels a sequence (e.g., the first sequence of requests or the second sequences of requests above) as a potential attack sequence, the attack sequence identification engine 144 compares other sequences from multiple user systems 110 or from multiple accounts for a user system 110 to determine if any additional potential attack sequences have been received. Additional details about identifying additional potential attack sequences are described below. The attack sequence identification engine provides the sequences that match one or more of the validated attack sequences 184, and the security engine 146 applies a security action to any user systems that have sequences that match. For example, the security engine 146 removes access of the user system 110 to the application software system 130 based on the output of the attack sequence identification engine 144.

Data storage system 180 includes data stores and/or data services that store digital content items including data received, used, manipulated, and produced by application software system 130 and/or malicious activity identification and removal system 140, including requests, request sequences, log files, known attack sequences, embeddings, and similarity scores. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, application software system 130, malicious activity identification and removal system 140, and data storage system 180 includes an interface embodied as computer programming code stored in computer memory that when executed causes a computing device to enable bidirectional communication with any other of user system 110, application software system 130, malicious activity identification and removal system 140 and data storage system 180 using a communicative coupling mechanism. Examples of communicative coupling mechanisms include network interfaces, inter-process communication (IPC) interfaces and application program interfaces (APIs).

Each of user system 110, application software system 130, malicious activity identification and removal system 140, and data storage system 180 is implemented using at least one computing device that is communicatively coupled to electronic communications network 120. Any of user system 110, application software system 130, malicious activity identification and removal system 140, and data storage system 180 can be bidirectionally communicatively coupled by network 120. User system 110 as well as other different user systems (not shown) can be bidirectionally communicatively coupled to application software system 130.

A typical user of user system 110 can be an administrator or end user of application software system 130, and/or malicious activity identification and removal system 140. User system 110 is configured to communicate bidirectionally with any of application software system 130 and/or malicious activity identification and removal system 140 over network 120.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 110, application software system 130, malicious activity identification and removal system 140, and data storage system 180 are implemented using computer software, hardware, or software and hardware, and can include combinations of automated functionality, data structures, and digital data, which are represented schematically in the figures. User system 110, application software system 130, malicious activity identification and removal system 140, and data storage system 180 are shown as separate elements in FIG. 1 for ease of discussion but, except as otherwise described, the illustration is not meant to imply that separation of these elements is required. The illustrated systems, services, and data stores (or their functionality) of each of user system 110, application software system 130, malicious activity identification and removal system 140, and data storage system 180 can be divided over any number of physical systems, including a single physical computer system, and can communicate with each other in any appropriate manner.

Figure 8:
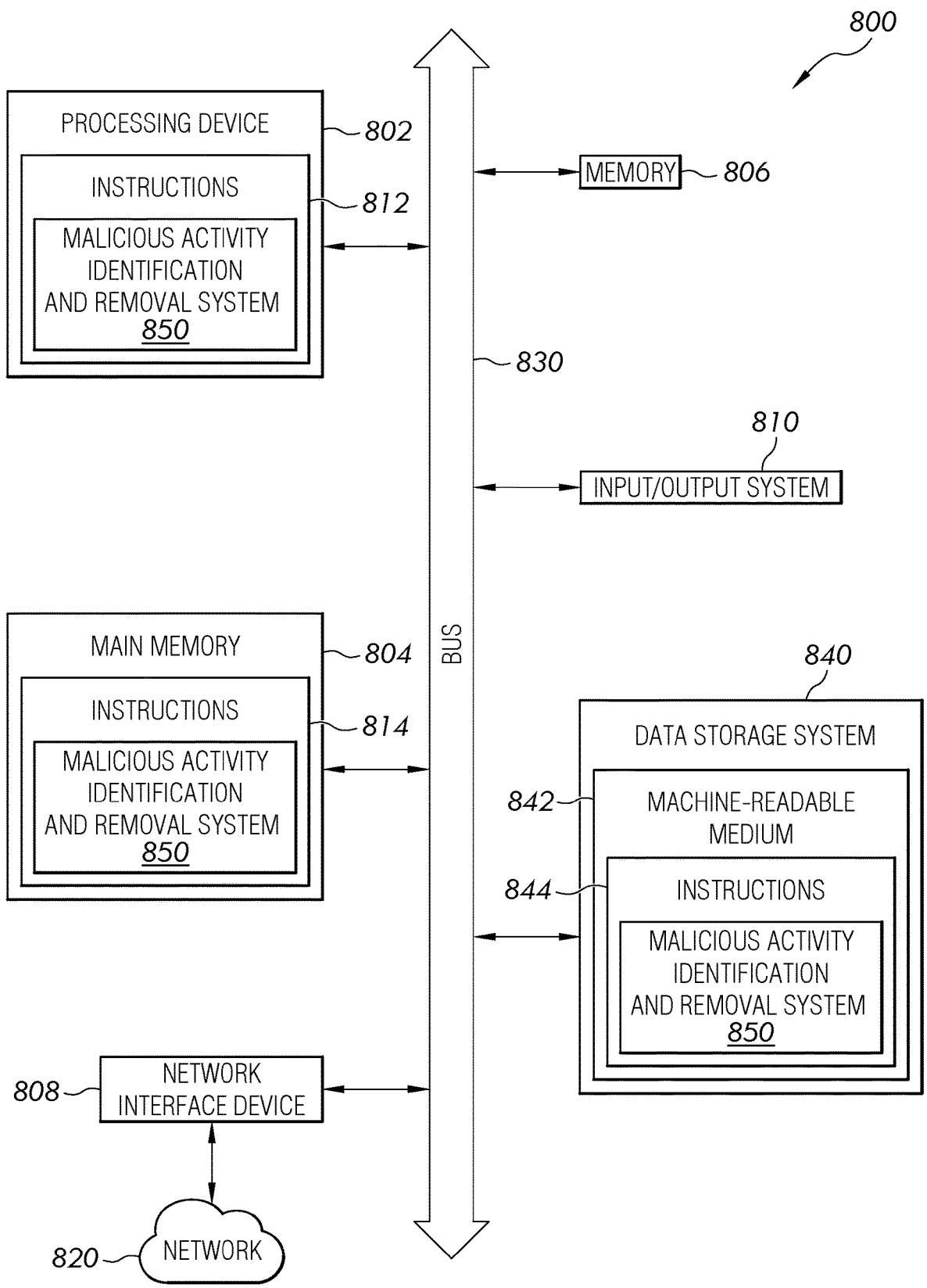
FIG. 8 is a block diagram of an example computer system 700 including an online media hosting system 750 in accordance with some embodiments of the present disclosure.

For ease of discussion, in FIG. 8, the malicious activity identification and removal system 140 is represented as malicious activity identification and removal system 850. Further details with regards to the operations of the malicious activity identification and removal system 140 are described below.

Figure 2:
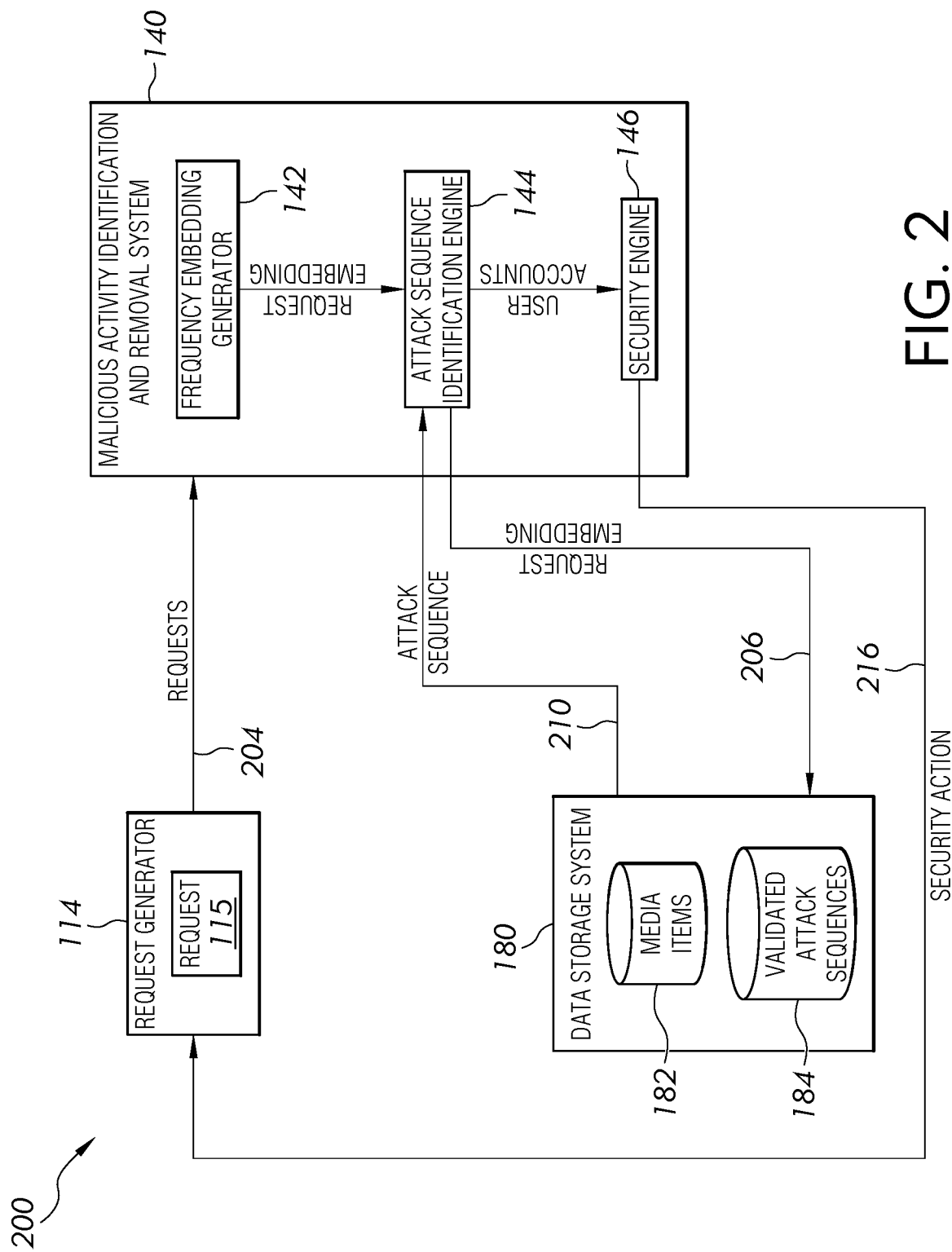
FIG. 2 is a flow diagram of an example method 200 for identifying malicious accounts and applying a security action in accordance with some embodiments of the present disclosure.

FIG. 2 is a flow diagram of an example method 200 for identifying malicious accounts and applying a security action in accordance with some embodiments of the present disclosure. The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by various components of the computing system 100 of FIG. 1 including portions of browser engine 113 and/or portions of malicious activity identification and removal system 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

In FIG. 2, according to the method 200, an end-user operates a user device executing browser engine 113 and request generator 114. For example, during an end-user's login session with an application software system 130, the user device sends a sequence of requests 204 from the user's login account to the application software system 130 (not shown in FIG. 2). The application software system 130 provides the sequence of requests 204 to malicious activity identification and removal system 140. In some implementations, the requests 204 are digital communications such as an API call or an HTTP request. The malicious activity identification and removal system 140 queries a data store to obtain the sequence of requests 204). The sequence of requests 204 can include multiple requests, e.g., multiple digital communications, such as API calls or HTTP requests, that are communicated between the user device and the application software system 130 during a time interval.

In response to receiving a sequence of requests 204 for a particular user of the application software system 130, the frequency embedding generator 142 computes one or more frequency embeddings based on the received sequence of requests 204. For example, a frequency embedding can indicate the frequency of occurrence of different types of requests within the sequence of requests 204. For instance the frequency embedding can indicate whether certain types of requests (e.g., view profile, job search, scroll feed, view content item, etc.) occur more frequently or less frequently than other types of requests, over a time interval, whether any particular type of request occurs in rapid succession during a time interval, or whether certain patterns of request types (e.g., login, view profile, view profile, view profile, logout) occur over the time interval.

As described above, the frequency embedding generator 142 computes a term frequency for each request. Using the tf-idf parlance, a request may be referred to as a term. The term may indicate a particular type of request. For example, the term can include a portion of the request that indicates the request type. For instance, if a request includes "view profile (xyz1099)" the first portion of the request (i.e., "view profile") can be used as the term.

Alternatively or in addition, an n-gram of a request type, in a sequence of requests (e.g., requests 204 from a particular request generator 114 operating on an associated user device), can be used as or included in a term. As used herein, n-gram may refer to a contiguous sequence of n items from a given sample of text, where n is a positive integer. For instance, the value of "n" can be set so that the size of the n-gram results in the n-gram being useful for detecting patterns of request sequences that may be of interest. For example, if a typical request includes the phrase "view profile" then if the value of n is set to a value greater than or equal to 3, e.g., n=4 or n=5, then the resulting n-gram indicates that there were more than three (e.g., 4 or 5) occurrences of the view profile request type in the sequence of requests. Setting n to a higher value, e.g., greater than or equal to three, can improve the system's ability to accurately detect abnormal or suspicious patterns of request sequences while setting n to a lower value such as 1 or 2 may result in too many false positives.

In some embodiments, the frequency embedding generator 142 computes a frequency for a n-gram of request types. The frequency embedding generator 142 also computes the inverse document frequency, which represents the frequency of occurrence of a particular request sequence in a document or across a larger body of requests 204 (e.g., to compare sequences of requests of different user devices). In some embodiments, the frequency embedding generator 142 computes a term frequency-inverse document frequency (TF-IDF or tf-idf) score for each sequence of request 115. By computing the TF-IDF score, the frequency embedding generator 142 creates an embedding in which each request sequence is represented as a vector position in an embedding space. The request embedding 206 is provided to the attack sequence identification engine 144 by the frequency embedding generator 142.

The attack sequence identification engine 144 receives the request embedding 206. While described as a single embedding, the request embedding 206 can include embeddings of sequences of requests 204 from multiple end user devices. In some embodiments, the request embedding 206 includes an embedding for each document, e.g., each log file for each user of the application software system, or for each user device (e.g., where a log file contains a list of all requests communicated by the user's account to the application software system over a predetermined time interval).

device. After receiving the request embedding 206, the attack sequence identification engine 144 determines whether the request embedding 206 matches one or more sequences of requests that are known potential attack sequences. For example, the attack sequence identification engine 144 searches the attack sequence store for each sequence of requests 204 to determine whether the sequence of requests 204 is a potential attack sequence. A sequence of request is determined to be a potential attack sequence if the computed similarity between a validated attack sequence (e.g., a validated attack sequence 184 of the data storage system 180) matches a request embedding 206. Match as used herein may refer to an exact match or to an approximate or inexact match, e.g., a statistical or probabilistic likelihood that a request sequence matches a validated attack sequence, for example.

In some implementations, to matches a request embedding 206. To detect a match, an n-gram of a sequence of requests is compared to the n-grams of the validated attack sequences. As used herein, an n-gram can represent a number of occurrences of a particular type of request. For example, a 2-gram indicates that a particular type of request occurs two times within the sequence of requests (e.g., a "view profile" request occurs twice within the same log file). If the attack sequence identification engine 144 detects any matches between the sequence of requests 204 (represented by the request embedding 206) and the validated attack sequences 184 of data storage system 180, the matching sequences are labeled and returned as attack sequences 210.

In some embodiments, the attack sequence identification engine 144 labels the matching sequences as attack sequences for exact matches or sequences that exceed a threshold similarity of requests (e.g., 80% of requests match). In other embodiments, the attack sequence identification engine generates normalized threshold values that adjusts the scale of the numbers of sequences to a value between "0" and "1" that represents a relative frequency across all of the types of requests. For example, if a "profile view" type of request has a frequency of 40, and a "login request" type of request has a frequency of "60," the normalized threshold value is 0.8 and the normalized values of the request types are 0.4 and 0.6, respectively.

The attack sequence identification engine 144 also compares each sequence of requests 204 to the other sequences received. For example, the attack sequence identification engine 144 identifies that a first sequence from a first user device matches as a potential attack sequence. The attack sequence identification engine 144 compares additional sequences (e.g., a second, third, etc.) that have been received to determine any sequences that are similar to the first sequence. In one example, the sequences that are similar to the first sequence contain 80% of requests of the same type. If the attack sequence identification engine 144 determines any additional matches to the first sequence, the user accounts associated with the additional matches are included in the user accounts 212 for applying a security action 216 as described below.

Figure 3:
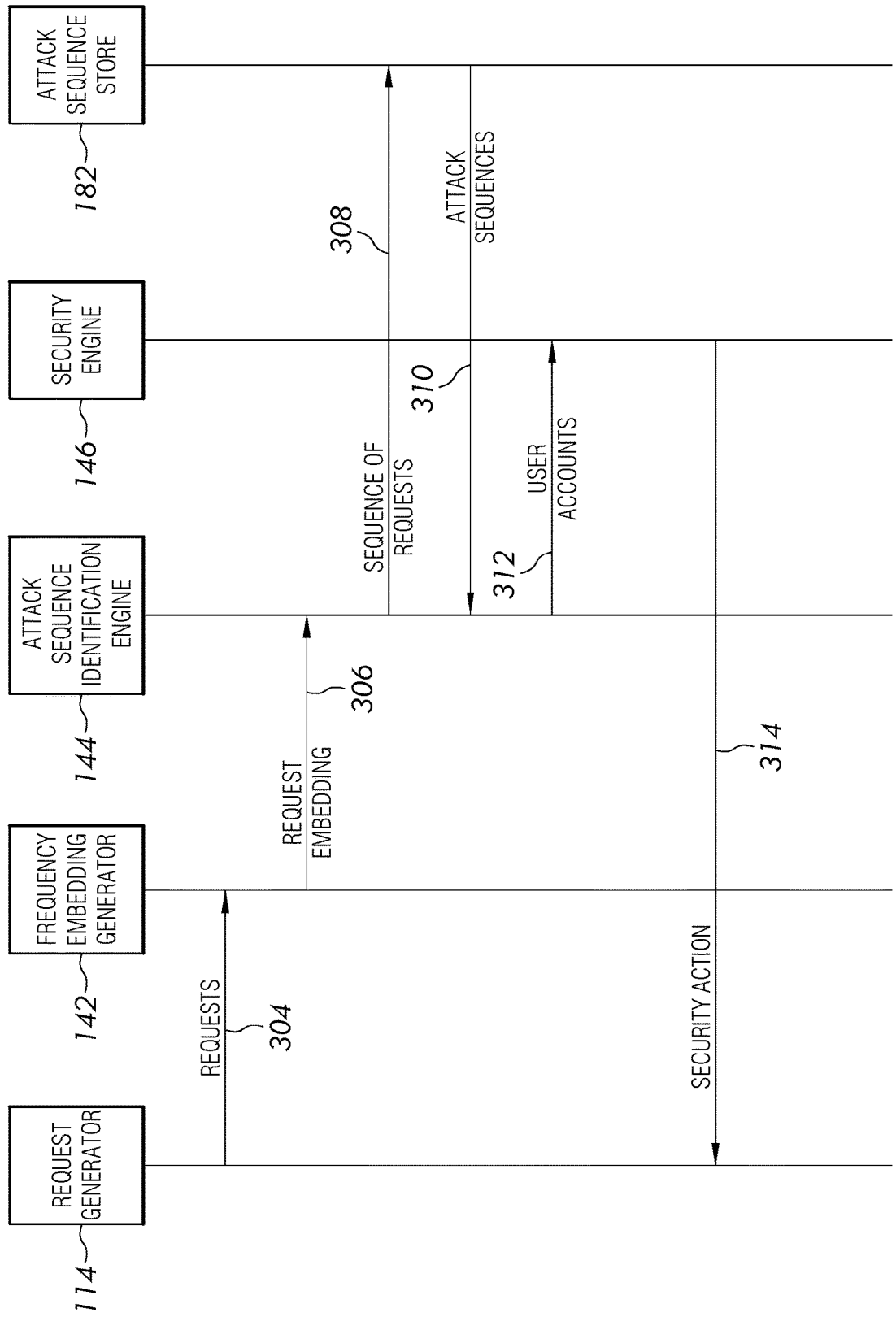
FIG. 3 is a timing diagram of an example method 300 for identifying malicious accounts and applying a security action in accordance with some embodiments of the present disclosure.

FIG. 3 is a timing diagram of an example method 300 for identifying malicious accounts and applying a security action in accordance with some embodiments of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by various components of the computing system 100 of FIG. 1 including portions of browser engine 113 and/or malicious activity identification and removal system 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

The method 300 receives requests and identifies and applies security actions 314 to sequences of requests that are identified as attack sequences. As described above, the requests 204 are received by the frequency embedding generator 142 from the request generator 114 that is executing on the end user device. In response to receiving requests 304, the frequency embedding generator 142 computes a TF-IDF of the requests 304 such that each type of request is represented as a term and each sequence of requests is represented as a document. The frequency embedding generator 142 produces the request embedding 306 that represents various sequences that include multiple requests 304 as described above.

The attack sequence identification engine 144 receives the request embedding 306 and compares each sequence of requests 304 to validated attack sequences stored in the data storage system 180. Further as described above, once a sequence of requests 304 is identified as a potential attack sequence using a similarity threshold and a validated attack sequence, the attack sequence identification engine 144 identifies additional sequences of requests that are similar to the potential attack sequence. The attack sequence identification engine 144 selects a set of attack sequences 310 based on a match between one of the sequence of requests 304 and a validated attack sequence stored in data storage system 180.

The attack sequence identification engine 144 computes a number for each type of request in the sequences. The attack sequence identification engine 144 compares the numbers of each type of request to the similarity threshold. The attack sequence identification engine 144 determines that the sequence is a potential attack sequence if the number for each type of request exceeds a threshold similarity of requests. For example, the attack sequence identification engine 144 determines a match for a validated attack sequence with 5 consecutive profile views within a predetermined time period and a sequence with 4 consecutive profile views in the same predetermined time period (e.g., within 20% of requests match within a common time period).

After selecting the attack sequences 310 from the various sequence of requests 304, the attack sequence identification engine 144 identifies user accounts associated with each attack sequence 310. The user accounts 312 represent end users of user devices (e.g., user devices 110 of FIG. 1) that have an account with the online media hosting service. The user accounts 312 are provided to the security engine 146 for applying a security action 314. In some embodiments, a sequence of requests that is identified as a potential attack sequence initiates a security trigger to apply a security action 314 to the user accounts 312. For example, the detection of a potential attack sequence initiates a security trigger to identify similar sequences from different users or user devices that are applying a similar attack. In order to identify the similar sequences from different users, the attack sequence identification engine 144 computes similarity between the embedding of the potential attack sequence and other embeddings within a threshold distance. For example, if the embedding of the potential attack sequence and a number of other embeddings are similar, additional potential attack sequences can be identified. In response to receiving the user accounts 312 and/or identifying additional potential attack sequences, the security engine 146 removes or restricts access to the online media hosting service for the user accounts 312.

Figure 4:
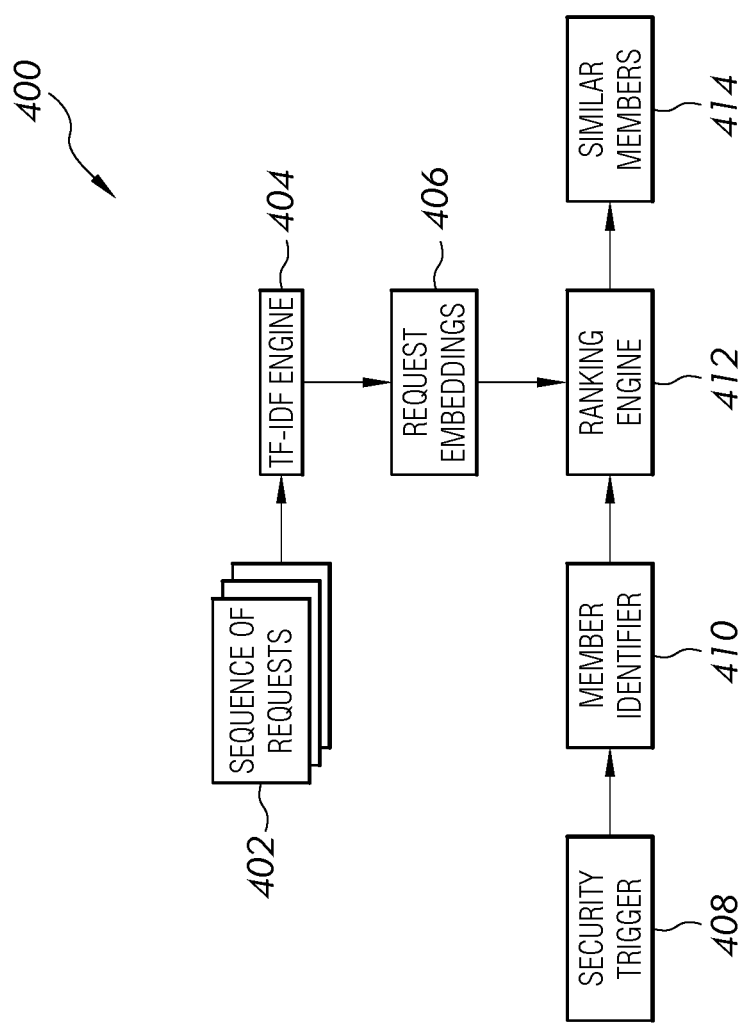
FIG. 4 is an example of identifying and ranking similar sequences of activities in accordance with some embodiments of the present disclosure.

FIG. 4 is an example of identifying and ranking similar sequences of activities in accordance with some embodiments of the present disclosure. The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by various components of the computing system 100 of FIG. 1 including portions of browser engine 113 and/or portions of malicious activity identification and removal system 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

As described above, sequences of requests 402 are processed by a TF-IDF engine 404. The TF-IDF engine 404 computes the TF-IDF for each sequence of the sequences of requests 403 that are received from different user devices. The TF-IDF engine 404 generates the request embeddings 406 that represents a frequency of all sequences of requests received by the malicious activity identification and removal system 140. The request embeddings are received by a ranking engine 412 for analysis of similar sequences associated with different user accounts or user devices.

As described above, a particular sequence of requests from the sequences of requests is processed by the attack sequence identification engine and may be determined as a potential attack sequence. In some embodiments, a sequence of requests that is identified as a potential attack sequence initiates a security trigger 408. For example, the detection of a potential attack sequence initiates a security trigger to identify similar sequences from different users or user devices that are applying a similar attack. In order to identify the similar sequences from different users, the member identifier 410 associated with the user account of a potential attack sequence is selected for comparison to other users for identifying additional potential attack sequences.

The ranking engine 412 receives the member identifier 410 that is associated with a selected embedding of the request embeddings and compares all other embeddings for sequences of requests from other users to the selected embedding. In some embodiments, the ranking engine 412 applies a cosine similarity to determine a number of different sequences with similar embeddings. The user accounts associated with each of the different sequences that have similar embeddings are output as similar members 414. As described above, the security engine applies a restriction or removal action to the user accounts of the similar members 414.

For example, the attack sequence identification engine 144 computes a similarity (e.g., cosine similarity, percentage of matching requests, etc.) for the types of requests in the sequences for the user accounts. The attack sequence identification engine 144 uses the similarity to determine if the user accounts are applying common methods (e.g., a common automation of requests) and labels these users as potentially malicious users. In response to determining that one or more users is a potentially malicious user, the attack sequence identification engine 144 can initiate a security trigger using security engine 146. The security trigger limits (e.g., restricts or removes) access by the user systems 110 associated with the potentially malicious users to the application software system 130.

FIG. 5 is an example of request sequences 500 in accordance with some embodiments of the present disclosure. The request sequences 500 include a nominal sequence of requests 502 and a validated attack sequence 504 including multiple requests. As illustrated by FIG. 5, the validated attack sequence 504 has a higher frequency of requests such as "lix/treatments" which represents a scraping operation. In comparison, the nominal sequence of requests 502 (e.g., not a potential attack sequence) includes a variety of requests with frequencies that are in a normal range. Referring to FIGS. 9-11 for examples of request sequences, the attack sequence identification engine 144 determines that the sequence of requests, such as the nominal sequence of requests 1002, is not a malicious sequence of requests because the requests follow a normal user distribution. For example, the attack sequence identification engine 144 translates each of the requests into standardized tokens, as described above. The attack sequence identification engine 144 determines a distribution of the standardized tokens and an order in which the standardized tokens (e.g., representing requests) occur in the sequence as further described above. The attack sequence identification engine 144 determines that the sequence is a potential attack sequence by comparing the frequency and order to previously known attack sequences.

Figure 6A:
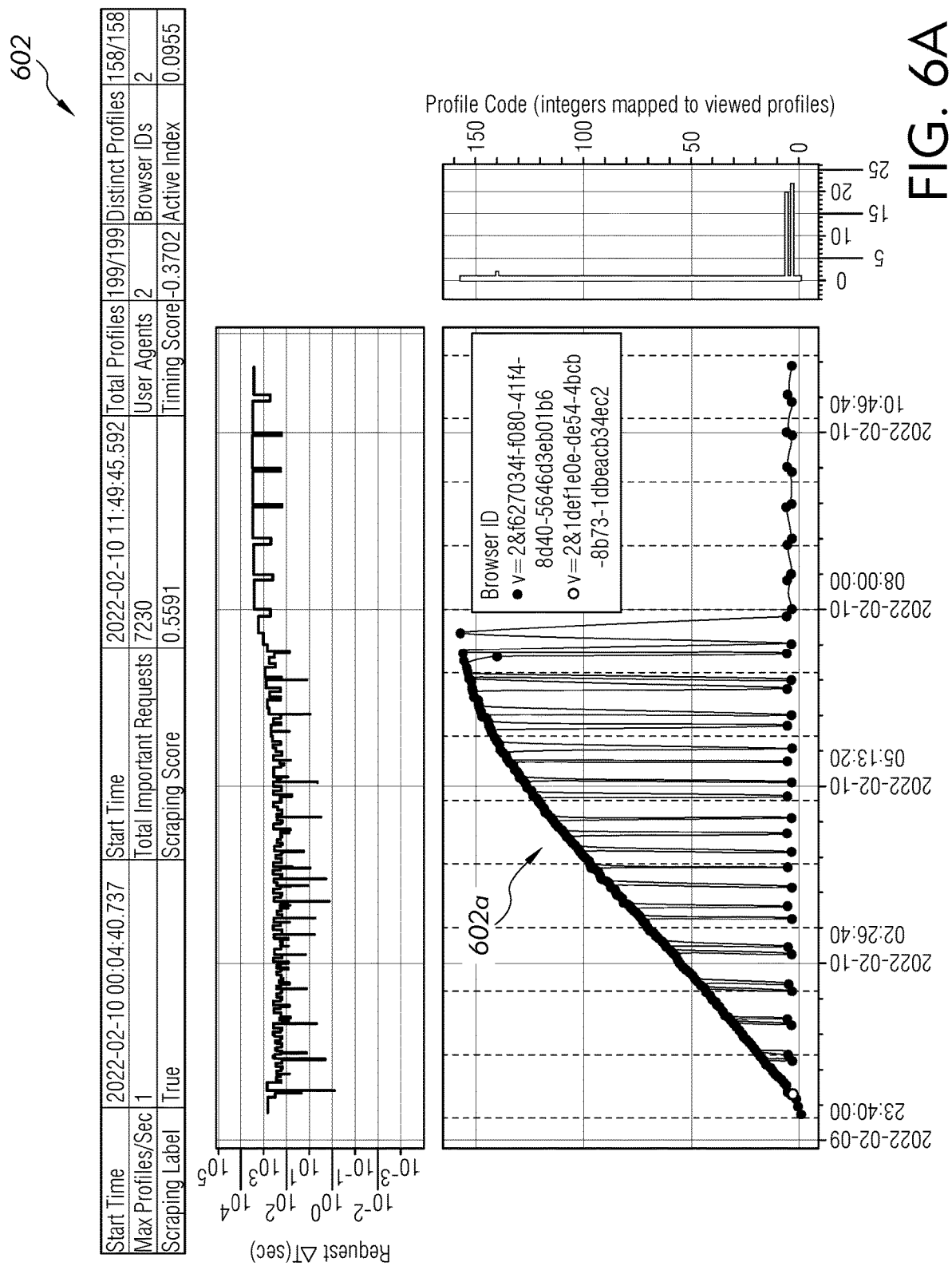
FIG. 6A, FIG. 6B, FIG. 6C, FIG. 6D, AND FIG. 6E are examples of multiple sequences of profile view requests in accordance with some embodiments of the present disclosure.
Figure 6B:
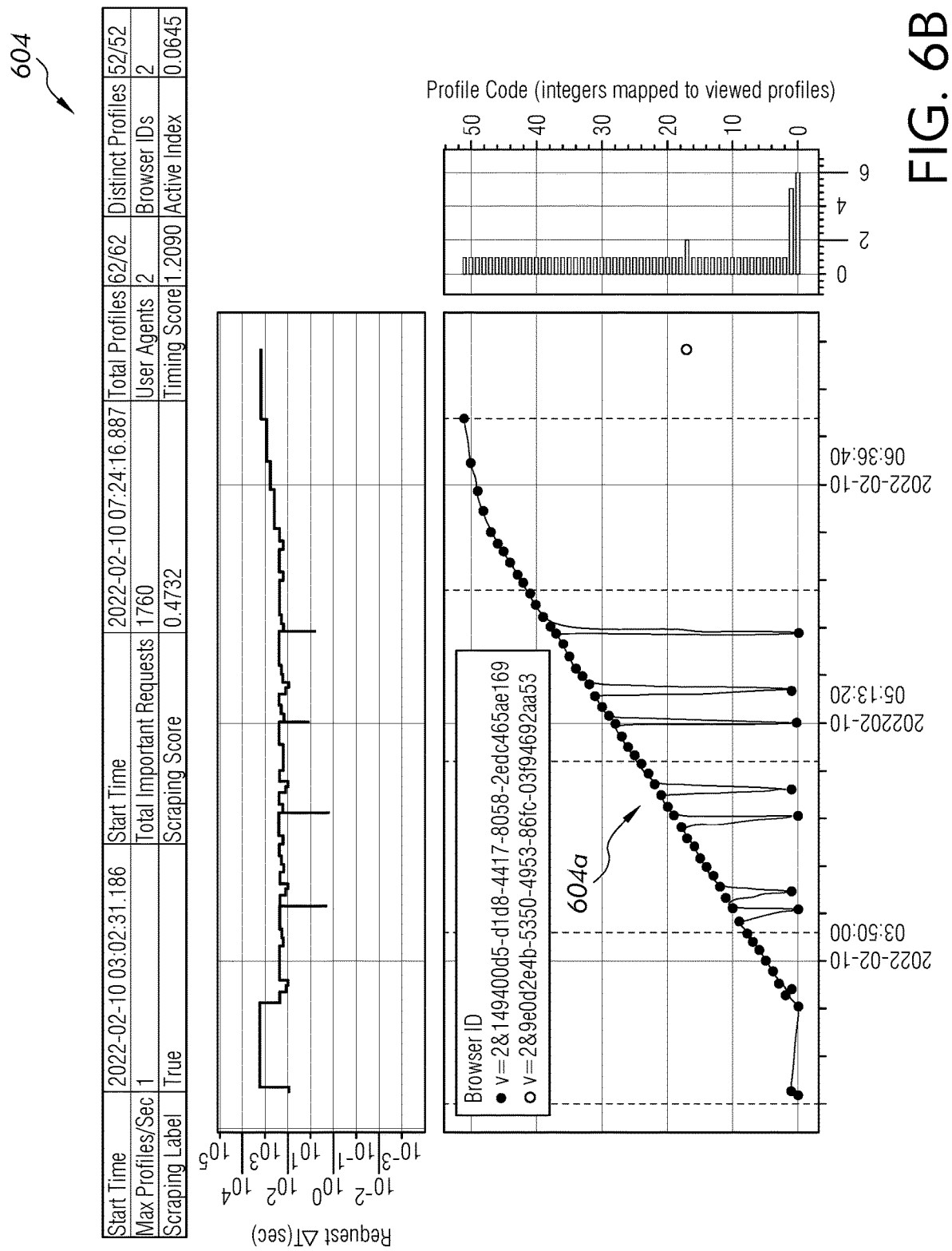
Figure 6C:
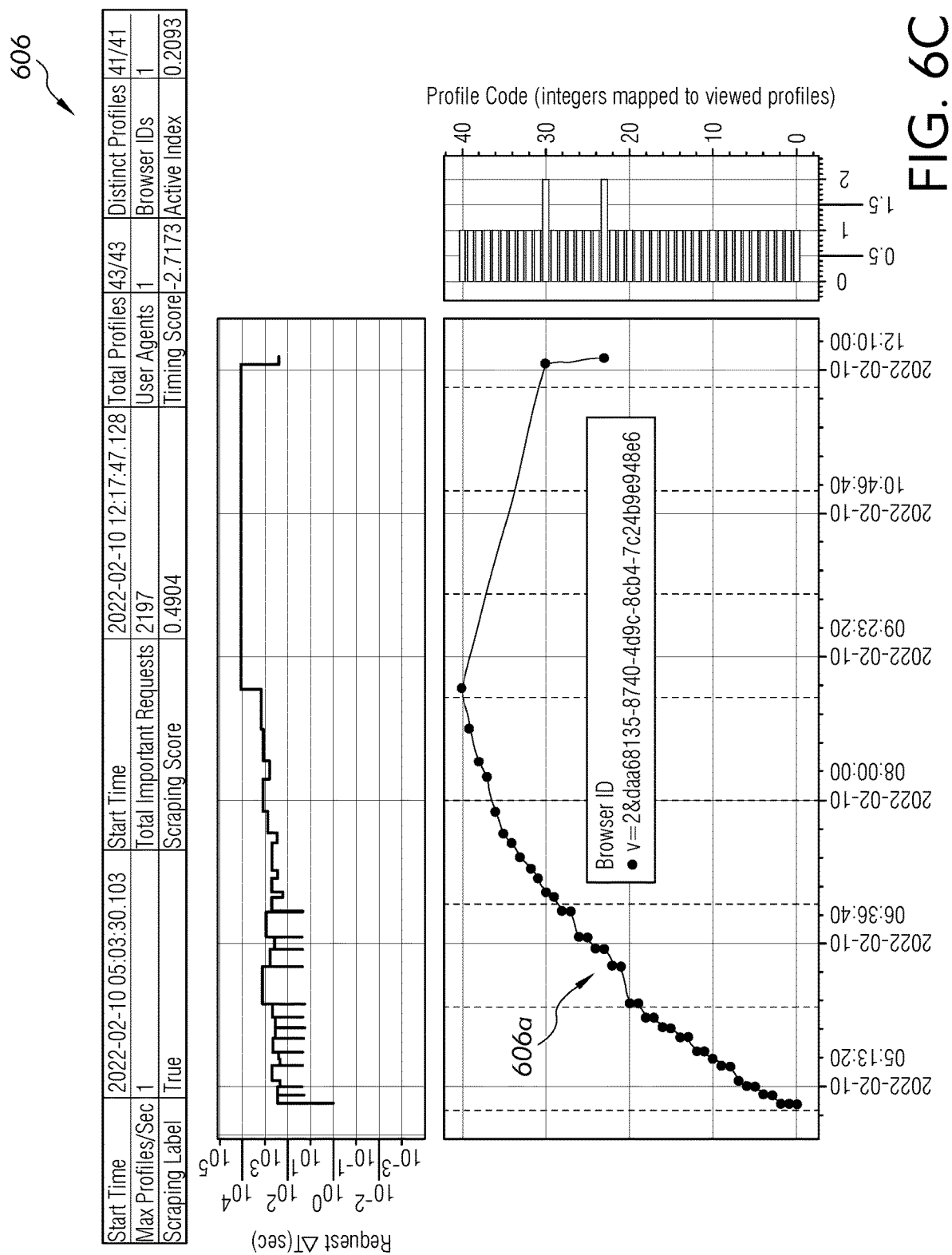
Figure 6D:
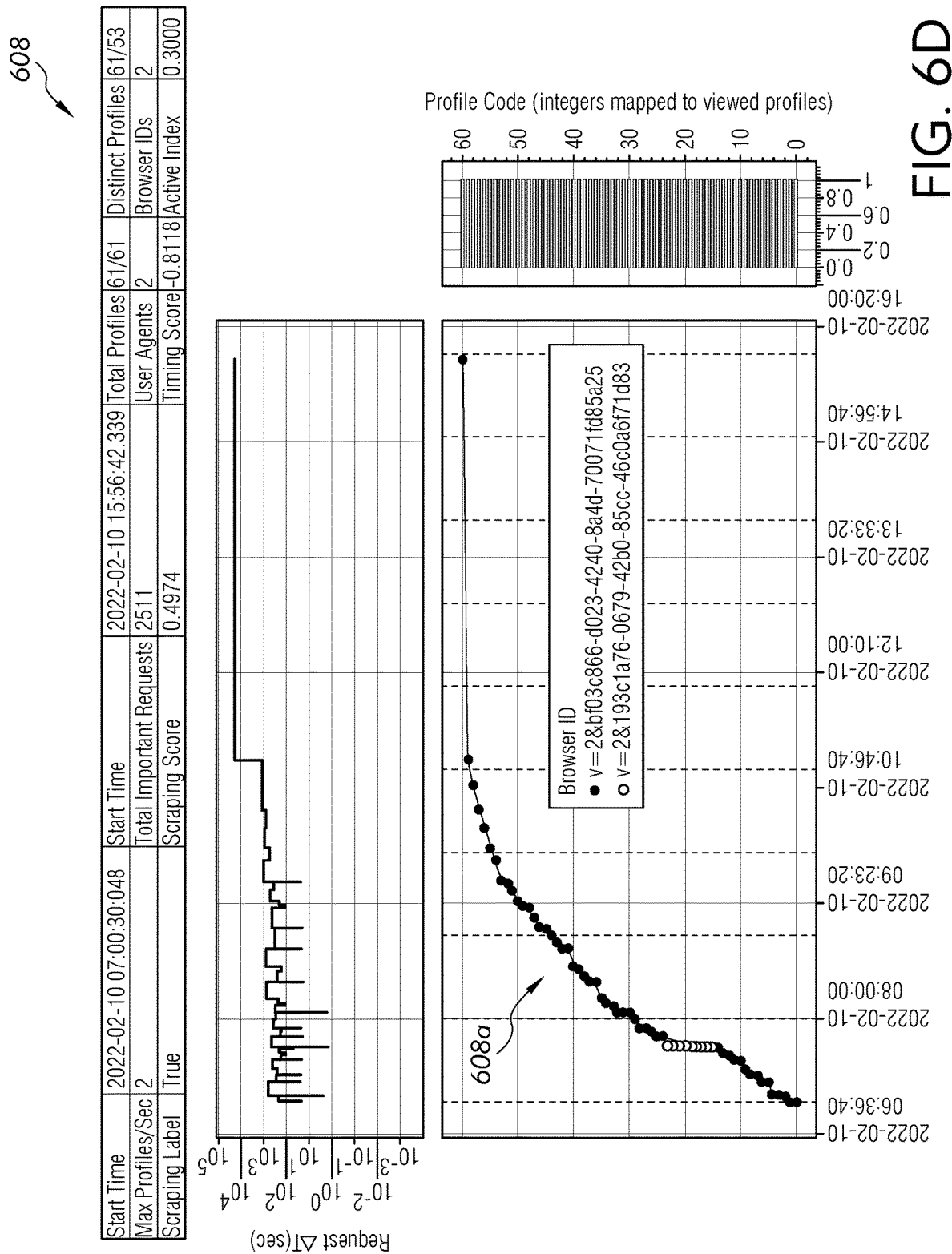
Figure 6E:
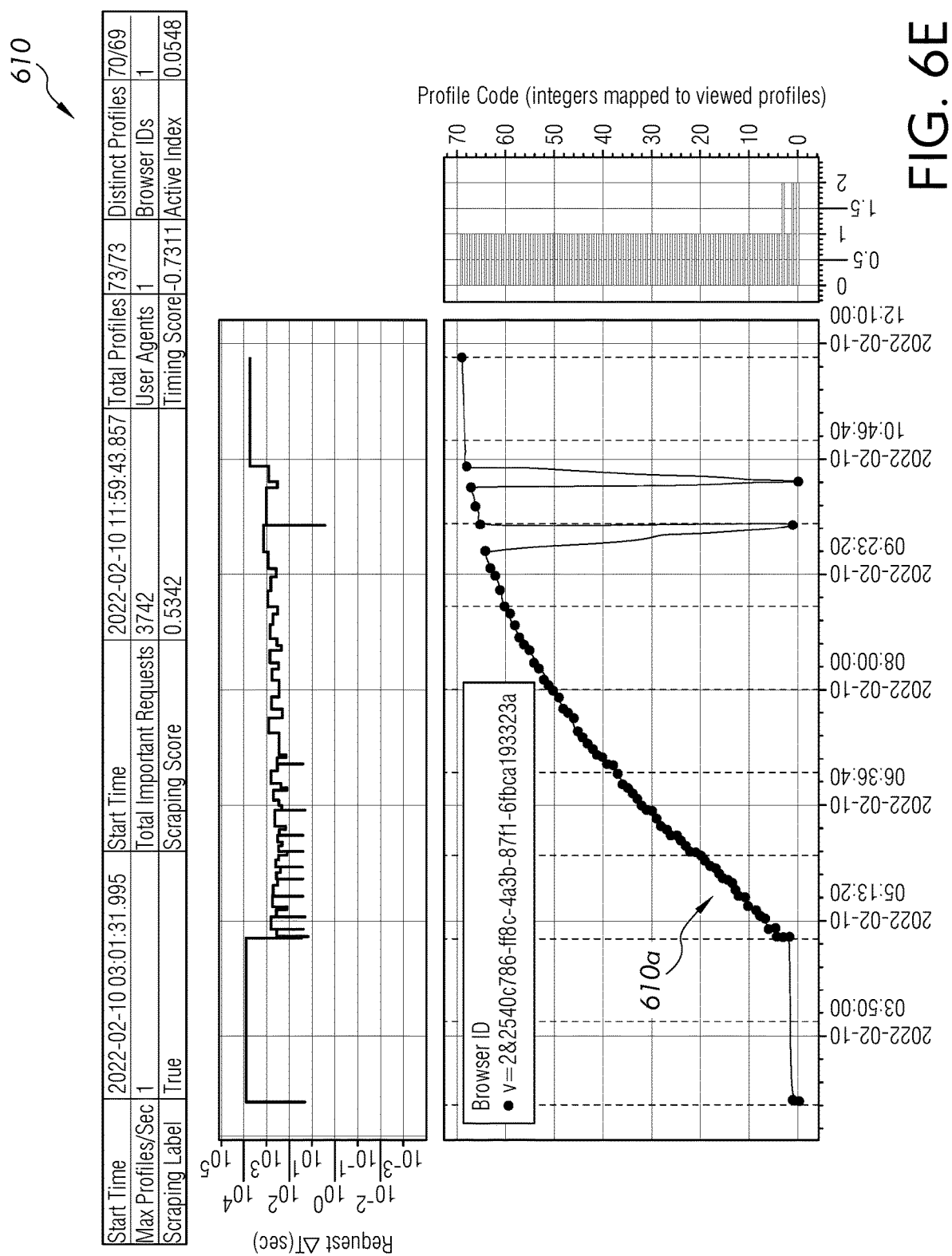

FIGS. 6A-E illustrate visual representations for multiple sequences of requests in accordance with some embodiments of the present disclosure. As illustrated in FIG. 6A, a validated attack sequence 602 depicts a number of requests over a time interval. The validated attack sequence includes a line 602A representing a number of requests to view profiles. As described above, the validated attack sequence 602 has a frequency (e.g., a slope of the line of 602A) of the requests of the type "view profile." As further illustrated in FIGS. 6B-E, additional sequences 604, 606, 608, and 610, respectively, are characterized by frequencies of requests (e.g., the slope of the corresponding lines 604A, 606A, 608A, 610A. As described above and illustrated visually by FIGS. 6A-E, the frequency of the validated attack sequence 602 and additional sequences 604 have a similar frequency of occurrence for the view profile request. The validated attack sequence 602 includes a sequence of requests previously received and identified as attack sequences. In some embodiments, the validated attack sequence is received from a user with reviewer roles (e.g., a security admin user) or a database of known attack sequences. As a result, the attack sequence identification engine 144 labels these sequences as potential attack sequences and initiates a security trigger. While FIGS. 6A-E illustrate a "view profile" type of request, any type of request can be represented in a similar manner.

Figure 7:
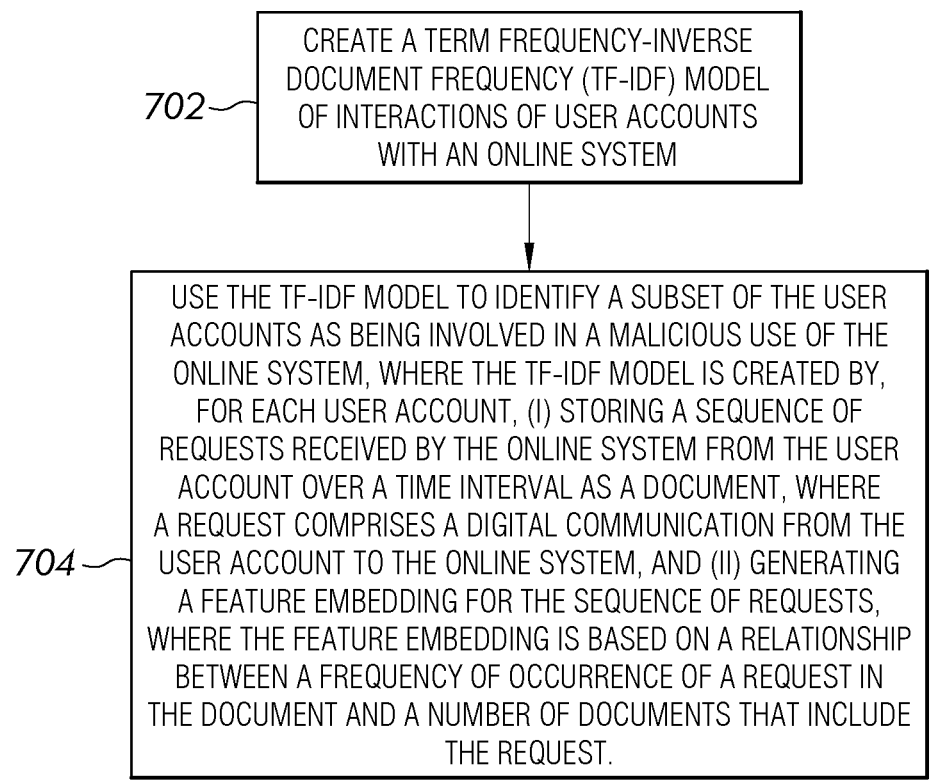
FIG. 7 is a flow diagram of an example method 600 to implement an attack sequence identification engine in accordance with some embodiments of the present disclosure.

FIG. 7 is a flow diagram of an example method 700 to implement an attack sequence identification engine in accordance with some embodiments of the present disclosure.

The method 700 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by portions of browser engine 113 and/or portions of malicious activity identification and removal system 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 702, the processing device creates a term frequency-inverse document frequency (tf-idf) model of interactions of user accounts with an online system Operation 702 is performed, for example, by the malicious activity identification and removal system 140, described above, in communication with browser engine 113 of user system 110, described above.

At operation 704, the processing devices uses the tf-idf model to identify a subset of the user accounts as being involved in a malicious use of the online system. The tf-idf model is created by, for each user account, (i) storing a sequence of requests received by the online system from the user account over a time interval as a document. A request includes a digital communication from the user account to the online system. The online system (ii) generates a feature embedding for the sequence of requests, with the feature embedding based on a relationship between a frequency of occurrence of a request in the document and a number of documents that include the request. Operation 704 is performed, for example, by malicious activity identification and removal system 140, described above, using the frequency embedding generator 142, described above.

FIG. 8 is a block diagram of an example computer system 800 including an online media system 850 in accordance with some embodiments of the present disclosure. The online media system 850 includes portions of browser engine 113 and/or portions of malicious activity identification and removal system 140. In FIG. 8, an example machine of a computer system 800 is shown, within which a set of instructions for causing the machine to perform any of the methodologies discussed herein, can be executed. In some embodiments, the computer system 800 can correspond to a component of a networked computer system (e.g., as a component of the computer system 100 of FIG. 1) that includes, is coupled to, or utilizes a machine to execute an operating system to perform operations corresponding to portions of browser engine 113 and/or portions of malicious activity identification and removal system 140 of FIG. 1. For example, computer system 800 corresponds to a portion of a user system 110 when the user system 110 is executing browser engine 113, and computer system 800 corresponds to a portion of application software system 130 and/or malicious activity identification and removal system 140 when the application software system 130 and/or malicious activity identification and removal system 140 is executing attack sequence identification engine 144.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a memory 806 (e.g., flash memory, static random access memory (SRAM), etc.), an input/output system 810, and a data storage system 840, which communicate with each other via a bus 830.

Processing device 802 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be at least one special-purpose processing device such as an application specific integrated circuit (ASIC), a field programmable gate array (FPGA), a digital signal processor (DSP), network processor, or the like. The processing device 802 is configured to execute instructions 812 for performing the operations and steps discussed herein.

In FIG. 8, malicious activity identification and removal system 850 represents browser engine 113 when the user system 110 is executing browser engine 113, and malicious activity identification and removal system 850 represents frequency embedding generator 142, attack sequence identification engine 144, and/or security engine 146 when the application software system 130 and/or malicious activity identification and removal system 140 is executing frequency embedding generator 142, attack sequence identification engine 144, and/or security engine 146. Instructions 812 include portions of online media system 750 when those portions of the malicious activity identification and removal system 850 are being executed by processing device 802. Thus, similar to the description above, the malicious activity identification and removal system 850 is shown in dashed lines as part of instructions 812 to illustrate that, at times, portions of the malicious activity identification and removal system 850 are executed by processing device 802. For example, when at least some portion of the malicious activity identification and removal system 850 is embodied in instructions to cause processing device 802 to perform the method(s) described above, some of those instructions can be read into processing device 802 (e.g., into an internal cache or other memory) from main memory 804 and/or data storage system 840. However, it is not required that all of the malicious activity identification and removal system 850 be included in instructions 812 at the same time and portions of the malicious activity identification and removal system 850 are stored in at least one other component of computer system 800 at other times, e.g., when at least one portion of the malicious activity identification and removal system 850 are not being executed by processing device 802.

The computer system 800 further includes a network interface device 808 to communicate over the network 820. Network interface device 808 provides a two-way data communication coupling to a network. For example, network interface device 808 can be an integrated-services digital network (ISDN) card, cable modem, satellite modem, or a modem to provide a data communication connection to a corresponding type of telephone line. As another example, network interface device 808 can be a local area network (LAN) card to provide a data communication connection to a compatible LAN. Wireless links can also be implemented. In any such implementation network interface device 808 can send and receive electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 800.

Computer system 800 can send messages and receive data, including program code, through the network(s) and network interface device 808. In the Internet example, a server can transmit a requested code for an application program through the Internet and network interface device 808. The received code can be executed by processing device 802 as it is received, and/or stored in data storage system 840, or other non-volatile storage for later execution.

The input/output system 810 includes an output device, such as a display, for example a liquid crystal display (LCD) or a touchscreen display, for displaying information to a computer user, or a speaker, a haptic device, or another form of output device. The input/output system 810 can include an input device, for example, alphanumeric keys and other keys configured for communicating information and command selections to processing device 802. An input device can, alternatively or in addition, include a cursor control, such as a mouse, a trackball, or cursor direction keys for communicating direction information and command selections to processing device 802 and for controlling cursor movement on a display. An input device can, alternatively or in addition, include a microphone, a sensor, or an array of sensors, for communicating sensed information to processing device 802. Sensed information can include voice commands, audio signals, geographic location information, and/or digital imagery, for example.

The data storage system 840 includes a machine-readable storage medium 842 (also known as a computer-readable medium) on which is stored at least one set of instructions 844 or software embodying any of the methodologies or functions described herein. The instructions 844 can also reside, completely or at least partially, within the main memory 804 and/or within the processing device 802 during execution thereof by the computer system 800, the main memory 804 and the processing device 802 also constituting machine-readable storage media.

In one embodiment, the instructions 844 include instructions to implement functionality corresponding to a media player (e.g., the frequency embedding generator 142, attack sequence identification engine 144, and/or security engine 146 and/or malicious activity identification and removal system 140 of FIG. 1).

Dashed lines are used in FIG. 8 to indicate that it is not required that the malicious activity identification and removal system 850 be embodied entirely in instructions 812, 814, and 844 at the same time. In one example, portions of the online media system are embodied in instructions 844, which are read into main memory 804 as instructions 814, and portions of instructions 814 are read into processing device 802 as instructions 812 for execution. In another example, some portions of the online media system are embodied in instructions 844 while other portions are embodied in instructions 814 and still other portions are embodied in instructions 812.

While the machine-readable storage medium 842 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes creating a term frequency-inverse document frequency (tf-idf) model of interactions of a plurality of user accounts with an online system, wherein the tf-idf model is created by, for a user account of the plurality of user accounts, (i) storing a sequence of requests received by the online system from the user account over a time interval as a document, wherein a request comprises a digital communication from the user account to the online system, and (ii) generating a feature embedding for the sequence of requests, wherein the feature embedding is based on a relationship between, a frequency of occurrence of a request in the document and a number of documents that include the request, and using the tf-idf model, identifying a subset of the plurality of user accounts as being involved in a malicious use of the online system.

An example 2 includes the subject matter of example 1 and further includes comparing a feature embedding for the sequence of requests to at least one second feature embedding for a validated attack sequence, wherein the comparison determines that the feature embedding for the sequence of requests matches the feature embedding for the validated attack sequence. An example 3 includes the subject matter of examples 1 or 2, and further includes initiating a network security action in response to determining that the feature embedding for the sequence of requests matches the feature embedding for the validated attack sequence. An example 4 that includes the subject matter of any of examples 1-3 and further includes using the tf-idf model to identify the subset of the plurality of user accounts as being involved in a malicious use of the online system includes for each request in the sequence of requests, mapping a request type to a term, and mapping the sequence of requests to a document by computing a frequency of a number of occurrences of the request type in the sequence of requests. An example 5 that includes the subject matter of any of examples 1-4 and further includes using the tf-idf model to identify the subset of the plurality of user accounts as being involved in a malicious use of the online system comprises computing a logarithmic relationship between the number of occurrences of the request type and the number of sequences of requests. An example 6 that includes the subject matter of any of examples 1-5 and further includes clustering at least one second sequence of requests having a feature embedding within a threshold distance of the feature embedding of the first sequence of requests, and identifying at least one second user account based on the clustering of the at least one second sequence of requests. An example 7 that includes the subject matter of any of examples 1-6 where a request includes an application programming interface (API) call, a request for a page load, a request for a content item, or another type of electronic communication from the user system to an application software system. An example 8 that includes the subject matter of any of examples 1-7 and further includes initiating a network security action on the at least one second user account in response to identifying at least one additional user account based on the clustering of the at least one second sequence of requests.

In an example 9, a system including at least one memory device, and a processing device, operatively coupled to the at least one memory device, to: create a term frequency-inverse document frequency (tf-idf) model of interactions of a plurality of user accounts with an online system, where the tf-idf model is created by, for a user account of the plurality of user accounts, (i) store a sequence of requests received by the online system from the user account over a time interval as a document, wherein a request comprises a digital communication from the user account to the online system, and (ii) generate a feature embedding for the sequence of requests, where the feature embedding is based on a relationship between a frequency of occurrence of a request in the document and a number of documents that include the request, and using the tf-idf model, identifying a subset of the plurality of user accounts as being involved in a malicious use of the online system.

An example 10 includes the subject matter of the system 9, where the processing device is further to: compare a feature embedding for the sequence of requests with at least one second feature embedding for a validated attack sequence, wherein the comparison determines that the feature embedding for the sequence of requests matches the feature embedding for the validated attack sequence. An example system 11 includes the subject matter of example 9 or 10 where the processing device is further to: initiate a network security action in response to determining that the feature embedding for the sequence of requests matches the feature embedding for a validated attack sequence. An example 12 includes the subject matter of any of systems 9-11 where using the tf-idf model to identify the subset of the plurality of user accounts as being involved in a malicious use of the online system includes, for each request in the sequence of requests, mapping a request type to a term; and mapping the sequence of requests to a document by computing a frequency of occurrences of the request type in the sequence of requests. An example 13 includes the subject matter of any of systems 9-12 where using the tf-idf model to identify the subset of the plurality of user accounts as being involved in a malicious use of the online system further includes computing a logarithmic relationship of the number of occurrences of the request type and the number of sequences of requests. An example 14 includes the subject matter of any of systems 9-13 where the processing device is further caused to cluster at least one second sequence of requests having a feature embedding within a threshold distance of the feature embedding of the first sequence of requests; and identify at least one second user account based on the clustering of at least one additional sequence of requests. An example 15 that includes the subject matter of any of systems 9-14, where a request comprises an application programming interface (API) call, a request for a page load, a request for a content item, or another type of electronic communication from the user system to an application software system. An example 16 that includes the subject matter of any of systems 9-15 where the processing device is further caused to: initiating a network security action on the at least one additional user account in response to identifying the at least one second user account based on the clustering of the at least one second sequence of requests. An example 17 includes the subject matter of any of systems 9-16 where the processing device is further to, using the tf-idf model, identify the subset of the plurality of user accounts as being involved in a malicious use of the online system by comparing the n-grams of a first request sequence with the n-grams of a second request sequence.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    creating a term frequency-inverse document frequency (tf-idf) model of interactions of a plurality of user accounts with an online system, wherein the tf-idf model is created by, for a user account of the plurality of user accounts, (i) storing a sequence of requests received by the online system from the user account over a time interval as a document, wherein each request of the sequence of requests comprises a digital communication from the user account to the online system, and (ii) generating a feature embedding for the sequence of requests, wherein the feature embedding is based on a relationship of the tf-idf model between a frequency of occurrence of a request in the document and a number of documents that include the request; and
    based on the feature embedding of the tf-idf model, identifying a subset of the plurality of user accounts as being involved in a malicious use of the online system,
    wherein based on the feature embedding of the tf-idf model, identifying the subset of the plurality of user accounts as being involved in a malicious use of the online system comprises:
        for each request in the sequence of requests, mapping a request type to a term, and mapping the sequence of requests to a document by computing a frequency of a number of occurrences of the request type in the sequence of requests.

2. The method of claim 1, further comprising comparing a feature embedding for the sequence of requests to at least one second feature embedding for a validated attack sequence, wherein the comparison determines that the feature embedding for the sequence of requests matches the feature embedding for the validated attack sequence.

3. The method of claim 2, further comprising initiating a network security action in response to determining that the feature embedding for the sequence of requests matches the feature embedding for the validated attack sequence.

4. The method of claim 1, wherein based on the feature embedding of the tf-idf model, identifying the subset of the plurality of user accounts as being involved in the malicious use of the online system comprises computing a logarithmic relationship between the number of occurrences of the request type and the number of sequences of requests.

5. The method of claim 1, further comprising:
clustering at least one second sequence of requests having a feature embedding within a threshold distance of the feature embedding of the first sequence of requests; and
identifying at least one second user account based on the clustering of the at least one second sequence of requests.

6. The method of claim 5, wherein a request comprises an application programming interface (API) call, a request for a page load, a request for a content item, or another type of electronic communication from the user system to an application software system.

7. The method of claim 5, further comprising:
in response to identifying at least one additional user account based on the clustering of the at least one second sequence of requests, initiating a network security action on the at least one second user account.

8. The method of claim 1, further comprising using the tf-idf model to identify the subset of the plurality of user accounts as being involved in a malicious use of the online system by comparing the n-grams of a first request sequence with the n-grams of a second request sequence.

9. A system comprising:
at least one memory device; and
a processing device, operatively coupled to the at least one memory device, to:
creating a term frequency-inverse document frequency (tf-idf) model of interactions of a plurality of user accounts with an online system, wherein
the tf-idf model is created by, for a user account of the plurality of user accounts, (i) storing a sequence of requests received by the online system from the user account over a time interval as a document, wherein each request of the sequence of requests comprises a digital communication from the user account to the online system, and (ii) generating a feature embedding for the sequence of requests, wherein the feature embedding is based on a relationship of the tf-idf model between a frequency of occurrence of a request in the document and a number of documents that include the request; and
based on the feature embedding of the tf-idf model, identifying a subset of the plurality of user accounts as being involved in a malicious use of the online system,
wherein based on the feature embedding of the tf-idf model, identifying the subset of the plurality of user accounts as being involved in a malicious use of the online system comprises:
for each request in the sequence of requests, mapping a request type to a term, and
mapping the sequence of requests to a document by computing frequency of a number of occurrences of the request type in the sequence of requests.

10. The system of claim 9, wherein the processing device is further to: compare a feature embedding for the sequence of requests with at least one second feature embedding for a validated attack sequence, wherein the comparison determines that the feature embedding for the sequence of requests matches the feature embedding for the validated attack sequence.

11. The system of claim 9, wherein the processing device is further to: initiate a network security action in response to determining that the feature embedding for the sequence of requests matches the feature embedding for a validated attack sequence.

12. The system of claim 9, wherein based on the feature embedding of the tf-idf model, identifying the subset of the plurality of user accounts as being involved in the malicious use of the online system further comprises computing a logarithmic relationship of the number of occurrences of the request type and the number of sequences of requests.

13. The system of claim 9, wherein the processing device is further to:
cluster at least one second sequence of requests having a feature embedding within a threshold distance of the feature embedding of the first sequence of requests; and
identify at least one second user account based on the clustering of at least one additional sequence of requests.

14. The system of claim 13, wherein a request comprises an application programming interface (API) call, a request for a page load, a request for a content item, or another type of electronic communication from the user system to an application software system.

15. The system of claim 13 wherein the processing device is further to:
in response to identifying the at least one second user account based on the clustering of the at least one second sequence of requests, initiating a network security action on the at least one additional user account.

16. The system of claim 9, wherein the processing device is further to, using the tf-idf model, identify the subset of the plurality of user accounts as being involved in a malicious use of the online system by comparing the n-grams of a first request sequence with the n-grams of a second request sequence.

* * * * *